United States Patent
Iwai et al.

(10) Patent No.: US 9,725,131 B2
(45) Date of Patent: Aug. 8, 2017

(54) BICYCLE DISC BRAKE ROTOR

(75) Inventors: Toru Iwai, Osaka (JP); Makoto Souwa, Osaka (JP)

(73) Assignee: Shimano Inc., Osaka (JP)

( * ) Notice: Subject to any disclaimer, the term of this patent is extended or adjusted under 35 U.S.C. 154(b) by 955 days.

(21) Appl. No.: 13/405,695

(22) Filed: Feb. 27, 2012

(65) Prior Publication Data
US 2013/0133997 A1    May 30, 2013

Related U.S. Application Data

(63) Continuation-in-part of application No. 13/304,332, filed on Nov. 24, 2011.

(51) Int. Cl.
| | |
|---|---|
| *F16D 65/12* | (2006.01) |
| *B62L 1/00* | (2006.01) |
| *B60T 7/10* | (2006.01) |

(52) U.S. Cl.
CPC ............. *B62L 1/00* (2013.01); *B60T 7/102* (2013.01)

(58) Field of Classification Search
CPC ............. F16D 65/12; F16D 2065/132; F16D 2250/0046; B62L 1/00; B60T 7/102
USPC ............................................ 188/26, 218 XL
See application file for complete search history.

(56) References Cited

U.S. PATENT DOCUMENTS

| | | | | |
|---|---|---|---|---|
| 5,626,211 | A * | 5/1997 | Gewelber et al. | 188/218 XL |
| 6,119,818 | A | 9/2000 | Krumbeck et al. | |
| 6,290,032 | B1 * | 9/2001 | Patrick et al. | 188/218 XL |
| 6,540,306 | B2 * | 4/2003 | Kanehisa | 301/59 |
| 2002/0066627 | A1 * | 6/2002 | Tsuge et al. | 188/218 XL |
| 2002/0179199 | A1 * | 12/2002 | Weng et al. | 148/437 |
| 2005/0006186 | A1 | 1/2005 | Iwai et al. | |
| 2006/0037819 | A1 * | 2/2006 | Takizawa | 188/26 |
| 2011/0240420 | A1 | 10/2011 | Souwa et al. | |
| 2012/0000736 | A1 | 1/2012 | Koshiyama | |

\* cited by examiner

*Primary Examiner* — Vishal Sahni
(74) *Attorney, Agent, or Firm* — Global IP Counselors, LLP (57) ABSTRACT

A bicycle disc brake rotor basically has a base rotor plate and a first thermally sprayed layer. The base rotor plate includes an outer portion having first and second base surfaces facing in opposite axial directions. The first thermally sprayed layer is laminated on the first base surface of the outer portion of the base rotor plate to form a first outer surface.

23 Claims, 8 Drawing Sheets

BICYCLE DISC BRAKE ROTOR

CROSS-REFERENCE TO RELATED APPLICATIONS

This application is a continuation-in-part application of U.S. patent application Ser. No. 13/304,332 filed on Nov. 24, 2011. The entire disclosure of U.S. patent application Ser. No. 13/304,332 is hereby incorporated herein by reference.

BACKGROUND

Field of the Invention

This invention generally relates to a bicycle disc brake rotor. More specifically, the present invention relates to a bicycle disc brake rotor with a configuration that promotes cooling of the braking surfaces.

Background Information

In recent years, some bicycles have been provided with disc brakes. Disc brake systems provide a substantial braking power in relationship to the amount of braking force applied to the brake lever. Also, disc brake systems typically provide a high level of consistency in all types of weather and riding conditions. Disc brake systems typically include a caliper housing, a first movable brake pad and a second fixed or movable brake pad. Disc brakes can be hydraulically actuated or mechanically actuated for moving the movable brake pad(s). The brake pads are positioned on either side of a rotor, which is attached to the front or back wheel of a bicycle. The brake pads are pressed against a brake disc or rotor that is fixed to the wheel to slow down or stop the rotation of the disc, and thus, slow down or stop the rotation of the wheel.

SUMMARY

While disc brake systems provide excellent performance, the braking action tends to generate a substantial amount of heat in the disc brake rotor. Thus, one aspect present in this disclosure is to provide a disc brake rotor with a configuration that promotes cooling of the disc brake rotor.

In view of the state of the known technology, a bicycle disc brake rotor is basically provided that comprises a base rotor plate and a first thermally sprayed layer. The base rotor plate includes an outer portion having first and second base surfaces facing in opposite axial directions. The first thermally sprayed layer is laminated on the first base surface of the outer portion of the base rotor plate to form a first outer surface.

These and other objects, features, aspects and advantages of the disclosed bicycle disc brake rotor will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
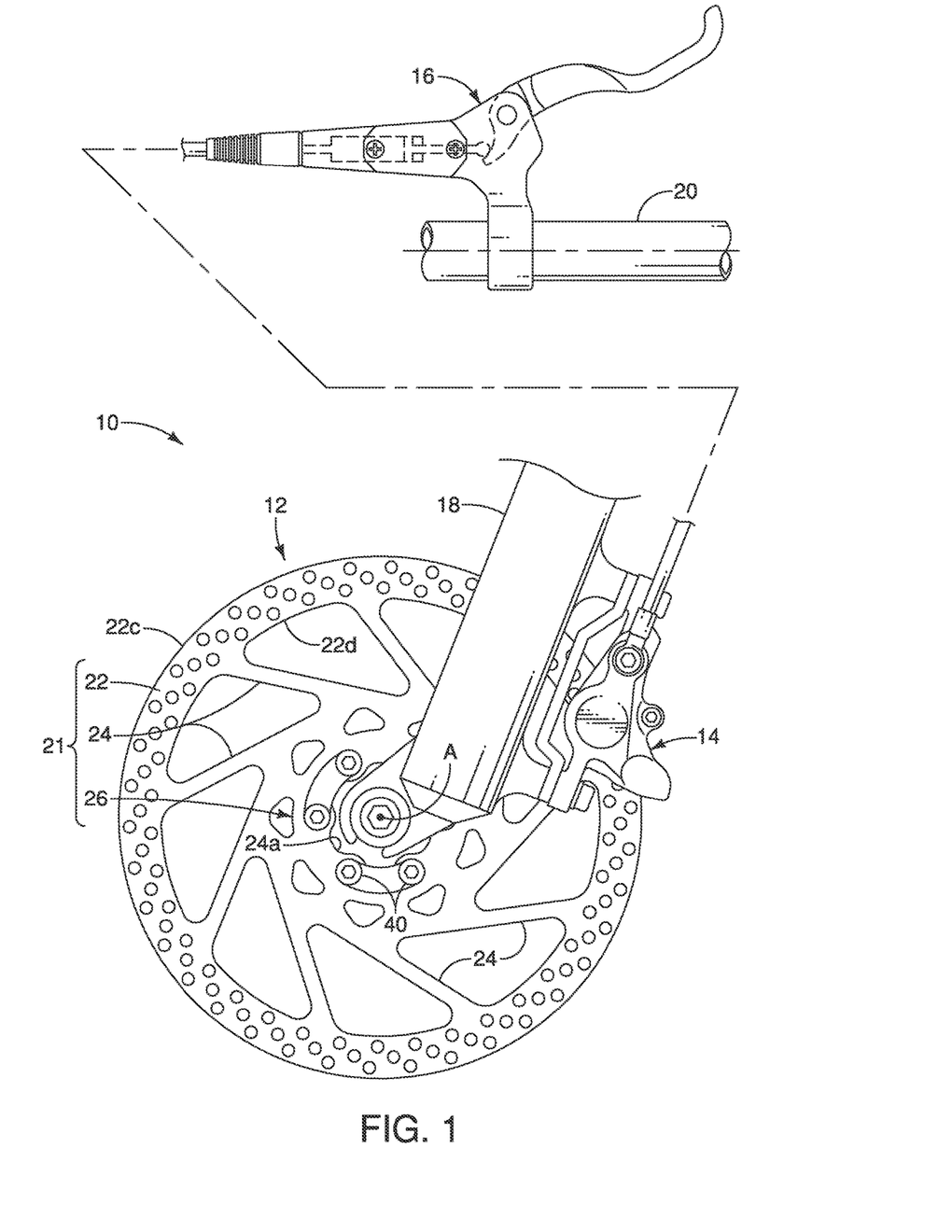
FIG. 1 is a partial side elevational view of a front disc brake system including a bicycle disc brake rotor in accordance with a first embodiment.

Referring initially to FIG. 1, a front disc brake system 10 is illustrated that includes a bicycle disc brake rotor 12 in accordance with a first embodiment. As explained below, the bicycle disc brake rotor 12 has a configuration that promotes cooling of the bicycle disc brake rotor 12. The front disc brake system 10 further includes a bicycle disc brake caliper 14 and a brake operating (actuating) mechanism 16. Basically, the bicycle disc brake rotor 12 is fixedly attached to a hub of a bicycle wheel (not shown). The bicycle disc brake caliper 14 is mounted to a bicycle fork 18, while brake operating mechanism 16 is attached to a bicycle handlebar 20. Since the operation and construction of the front disc brake system 10 is conventional, except for the construction of the bicycle disc brake rotor 12, the front disc brake system 10 will not be discussed or shown in further detail herein. Moreover, while the front disc brake system 10 is illustrated as a hydraulic braking system, the bicycle disc brake rotor 12 can be used with other types of braking systems as needed and/or desired.

The disc brake caliper 14 is constructed for selectively gripping (stopping rotation) of the bicycle disc brake rotor 12 to stop or slow the rotation of a bicycle wheel (not shown). During this braking operation, heat is generated that is transferred to the bicycle disc brake rotor 12 and the bicycle disc brake caliper 14. As explained below, the bicycle disc brake rotor 12 is designed to dissipate the heat generated during braking.

Figure 2:
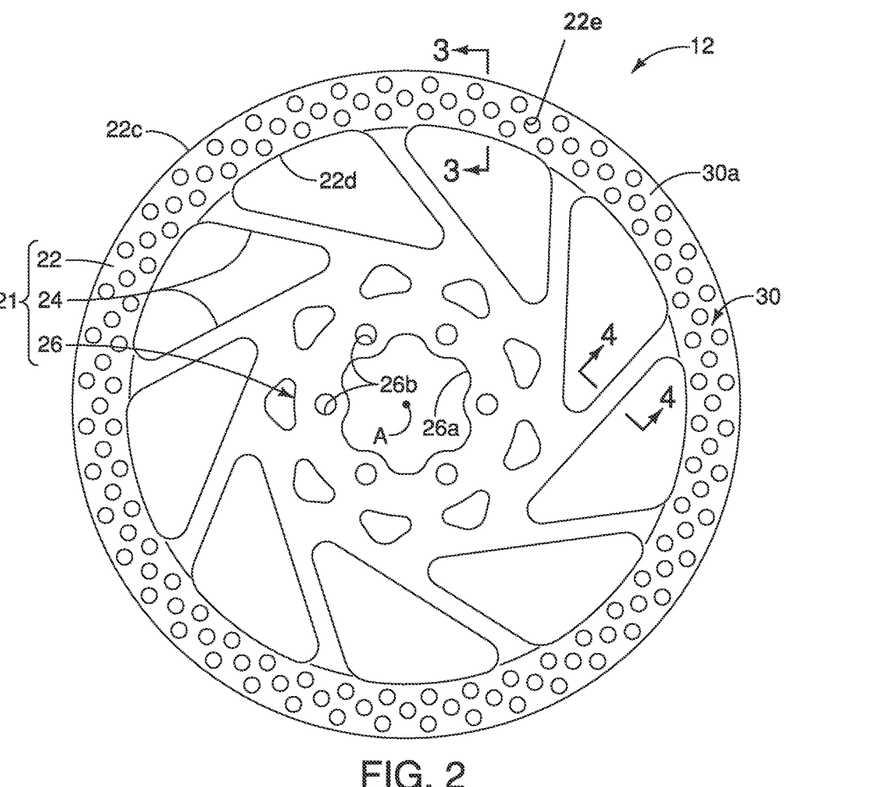
FIG. 2 is a side elevational view of the disc brake rotor illustrated in FIG. 1.
Figure 3:
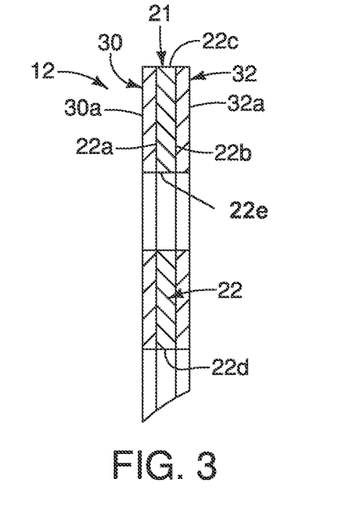
FIG. 3 is a cross sectional view of the bicycle disc brake rotor illustrated in FIGS. 1 to 4 as seen along section line 3-3 of FIG. 2.
Figure 4:
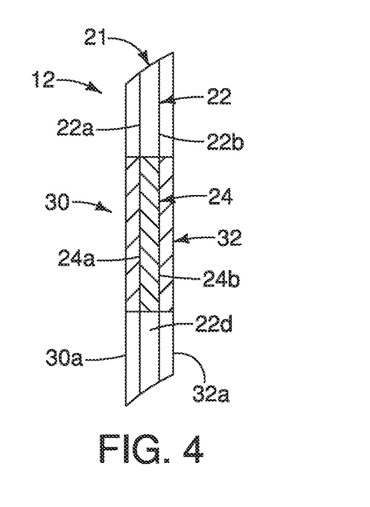
FIG. 4 is a cross sectional view of the bicycle disc brake rotor illustrated in FIGS. 1 and 2 as seen along section line 4-4 of FIG. 2.

Referring now to FIGS. 2 to 4, the bicycle disc brake rotor 12 has a base rotor plate 21 that basically includes an outer portion 22, a plurality of connecting arms 24 extending radially inward from the outer portion 22, and a hub mounting portion 26 coupled to inner ends of the connecting arms 24. The connecting arms 24 constitute a connecting portion of the base rotor plate 21 that connects the outer portion 22 to the hub mounting portion 26. Also the connecting arms 24 (i.e., the connecting portion) and the hub mounting portion 26 constitute an inner portion of the base rotor plate 21. Here in the first illustrated embodiment, the outer portion 22, the connecting arms 24 and the hub mounting portion 26 are integrally formed as a one-piece member of a suitable first material such as aluminum alloy or other suitable lightweight material. The outer portion 22 of the base rotor plate 21 has first and second base surfaces 22a and 22b that face in opposite axial directions of the bicycle disc brake rotor 12. The outer portion 22 of the base rotor plate 21 has an outer peripheral edge 22c and an inner peripheral edge 22d. The connecting arms 24 extend radially inward from the inner peripheral edge 22d of the outer portion 22.

The bicycle disc brake rotor 12 further includes a first thermally sprayed layer 30, which is laminated on the first base surface 22a of the outer portion 22 of the base rotor plate 21 to form a first outer surface 30a. Preferably, the bicycle disc brake rotor 12 further includes a second thermally sprayed layer 32, which is laminated on the second base surface 22b of the outer portion 22 of the base rotor plate 21 to form a second outer surface 32a. The first and second outer surfaces 30a and 32a are the outermost surfaces of the bicycle disc brake rotor 12. The outer portion 22 of the base rotor plate 21 also has a plurality of ventilation holes 22e, each having an internal circumferential surface. As understood from FIGS. 2 and 3, the internal circumferential surface of each ventilation hole 22e is at least partially free of the first and second thermally sprayed layers 30 and 32.

Preferably, the first and second thermally sprayed layers 30 and 32 are laminated to the outer portion 22, each of the connecting arms 24 and the hub mounting portion 26 by a cold spraying process. Thus, the first and second thermally sprayed layers 30 and 32 are secured to the outer portion 22 of the base rotor plate 21 with a separate fastener such as a rivet. The first and second thermally sprayed layers 30 and 32 are made of a second material (e.g., stainless steel) that is different from the first material (e.g., aluminum alloy) of the base rotor plate 21. Preferably, the material (e.g., stainless steel) of the first and second thermally sprayed layers 30 and 32 has a higher wear resistance than the material (e.g., aluminum alloy) of the outer portion 22 of the base rotor plate 21. In the first embodiment, the material (e.g., stainless steel) of the first and second thermally sprayed layers 30 and 32 has a lower thermal conductivity than the outer portion 22. Thus, the first and second outer surfaces 30a and 32a constitute first and second braking surfaces of the bicycle disc brake rotor 12 that are directly contacted by the brake pads of the bicycle disc brake caliper 14. As a result, in the first embodiment, the first and second thermally sprayed layers 30 and 32 of stainless steel are laminated to an aluminum alloy core of the base rotor plate 21 to provide both the durability and powerful braking properties of stainless and the lightness and heat dissipation of aluminum.

Here in the first illustrated embodiment, the outer portion 22 has a thickness of about one millimeter, while the thicknesses of the first and second thermally sprayed layers 30 and 32 are preferably less than one millimeter. For example, the outer portion 22 can have a thickness of one millimeter and the first and second thermally sprayed layers 30 and 32 can each have a thickness of 0.7 millimeter for a total outer rotor thickness of 2.4 millimeters.

In this first embodiment, the first and second thermally sprayed layers 30 and 32 are applied by a cold spraying process so as to trace the contours of the outer portion 22, each of the connecting arms 24 and the hub mounting portion 26. While the first and second thermally sprayed layers 30 and 32 completely covers the outer portion 22, each of the connecting arms 24 and the hub mounting portion 26 in the first illustrated embodiment, the first and second thermally sprayed layers 30 and 32 are not limited to this configuration. For example, the first and second thermally sprayed layers 30 and 32 can be applied to only cover the first and second base surfaces 22a and 22b of the outer portion 22 of the base rotor plate 21. Alternatively, the first and second thermally sprayed layers 30 and 32 can be applied such that the first and second thermally sprayed layers 30 and 32 overlie the first and second base surfaces 22a and 22b and partially overlie one or more of the connecting arms 24. The first and second thermally sprayed layers 30 and 32 can be applied to only one side or both sides of the connecting arms 24 as needed and/or desired.

In the first illustrated embodiment, the hub mounting portion 26 is integrally formed at the inner ends of the connecting arms 214 as a one-piece member of a suitable first material such as aluminum alloy or other suitable lightweight material. The hub mounting portion 26 includes an opening 26a for accommodating a hub axle therethrough, and a plurality of hub mounting holes 26b that are arranged circumferentially about a center rotational axis A of the bicycle disc brake rotor 12. The hub mounting portion 26 is mounted to a bicycle hub by a plurality of bolts 40 as seen in FIG. 1. Thus, the bicycle disc brake rotor 12 rotates with the bicycle hub about the center rotational axis A.

Figure 5:
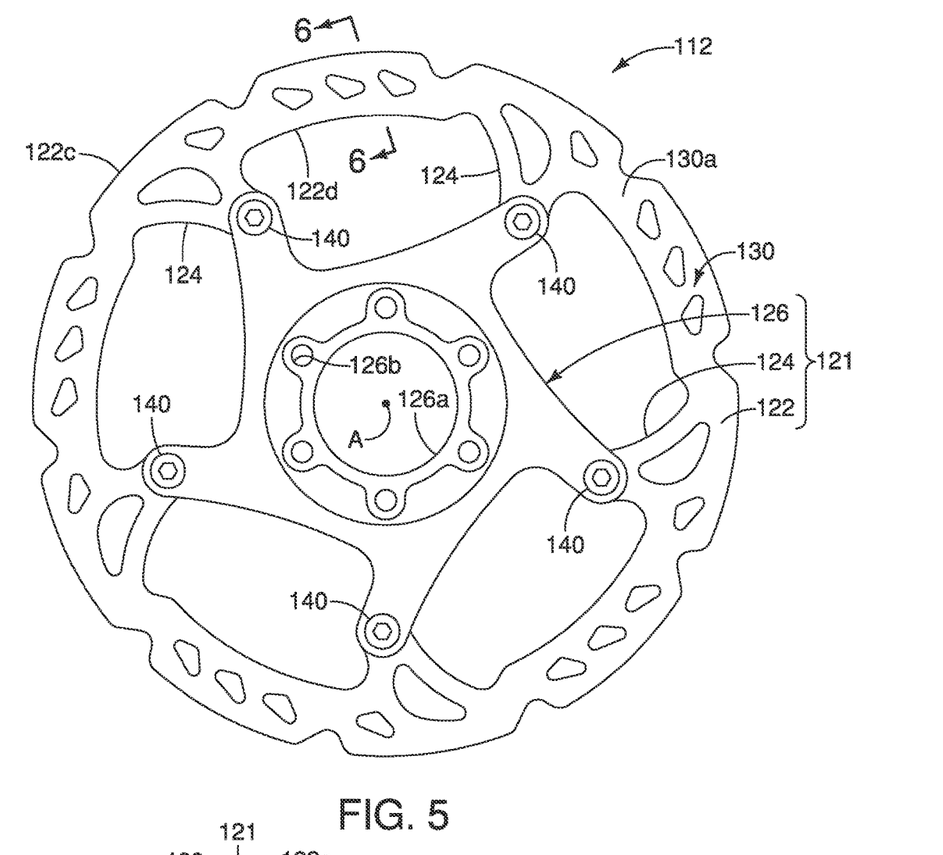
FIG. 5 is a side elevational view of a bicycle disc brake rotor in accordance with a second embodiment.
Figure 6:
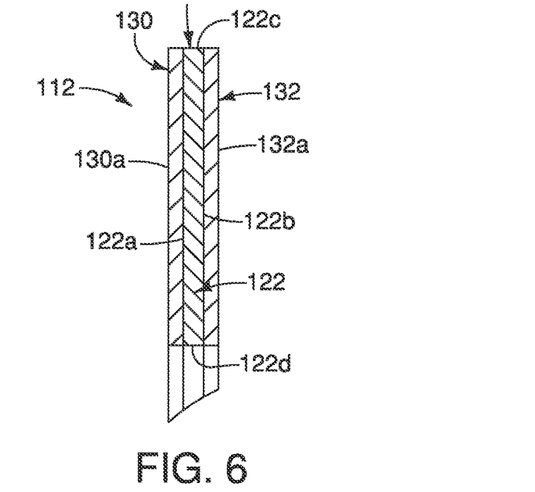
FIG. 6 is a cross sectional view of the bicycle disc brake rotor illustrated in FIGS. 1 to 4 as seen along section line 6-6 of FIG. 5.

Referring now to FIGS. 5 and 6, a bicycle disc brake rotor 112 in accordance with a second embodiment will now be explained. Here, the bicycle disc brake rotor 112 has a base rotor plate 121 that basically includes an outer portion 122, a plurality of connecting arms 124 extending radially inward from the outer portion 122, and a hub mounting portion 126 coupled to inner ends of the connecting arms 124. The connecting arms 124 constitute a connecting portion of the base rotor plate 121 that connects the outer portion 122 to the hub mounting portion 126. Also the connecting arms 124 (i.e., the connecting portion) and the hub mounting portion 126 constitute an inner portion of the base rotor plate 121. The bicycle disc brake rotor 112 further includes a first thermally sprayed layer 130, which is laminated on the first base surface 122a of the outer portion 122 of the base rotor plate 121 to form a first outer surface 130a. Preferably, the bicycle disc brake rotor 112 further includes a second thermally sprayed layer 132, which is laminated on the second base surface 122b of the outer portion 122 of the base rotor plate 121 to form a second outer surface 132a. The first and second outer surfaces 130a and 132a are the outermost surfaces of the bicycle disc brake rotor 112.

Here in the second illustrated embodiment, the hub mounting portion 126 is a separate member that is fixed to the inner ends of the connecting arms 214. Also the second illustrated embodiment, the outer portion 122 and the connecting arms 124 are integrally formed as a one-piece member of a suitable first material such as aluminum alloy or other suitable lightweight material. Thus, the bicycle disc brake rotor 112 is identical in construction to the bicycle disc brake rotor 12, except that hub mounting portion 126 is a separate member from the outer portion 122 and the connecting arms 124, and the hub mounting portion 126 does not include the first and second thermally sprayed layers 130 and 132. In view of the similarities between the bicycle disc brake rotors 12 and 112, the bicycle disc brake rotor 112 will not be discussed in great detail herein.

Similar to the prior embodiment, the outer portion 122 of the base rotor plate 121 has first and second base surfaces 122a and 122b that face in opposite axial directions of the bicycle disc brake rotor 112. The outer portion 122 of the base rotor plate 121 has an outer peripheral edge 122c and an inner peripheral edge 122d. The connecting arms 124 extend radially inward from the inner peripheral edge 122d of the outer portion 122. The hub mounting portion 126 includes an opening 126a for accommodating a hub axle therethrough, and a plurality of hub mounting holes 126b that are arranged circumferentially about the center rotational axis A of the bicycle disc brake rotor 112.

Figure 7:
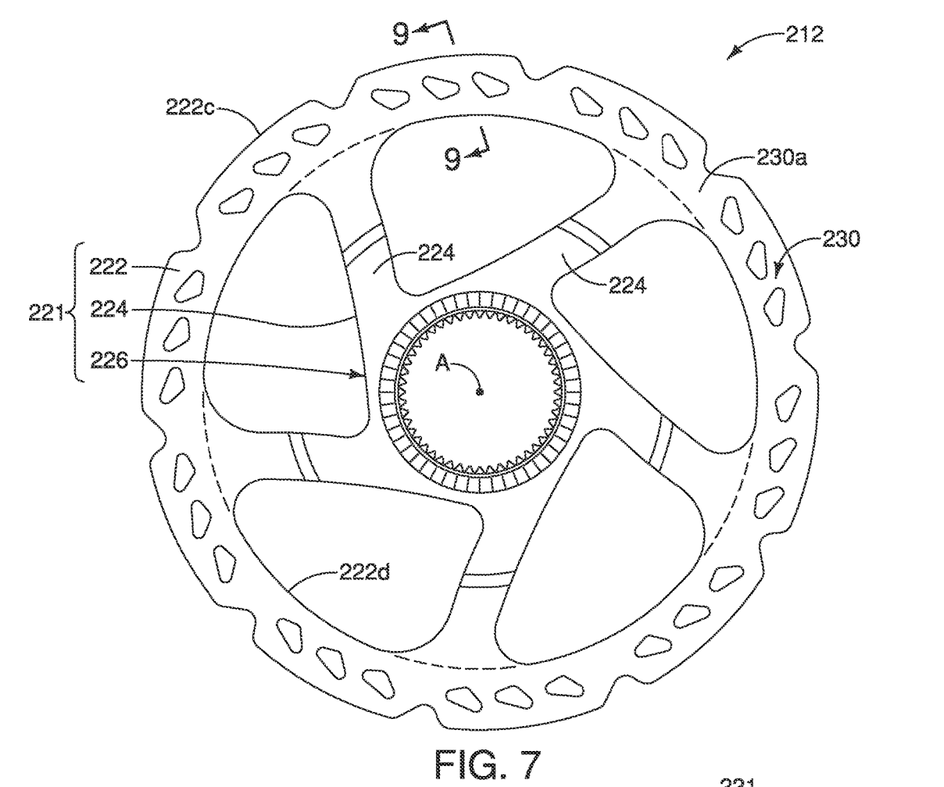
FIG. 7 is a side elevational view of a bicycle disc brake rotor in accordance with a third embodiment.
Figure 8:
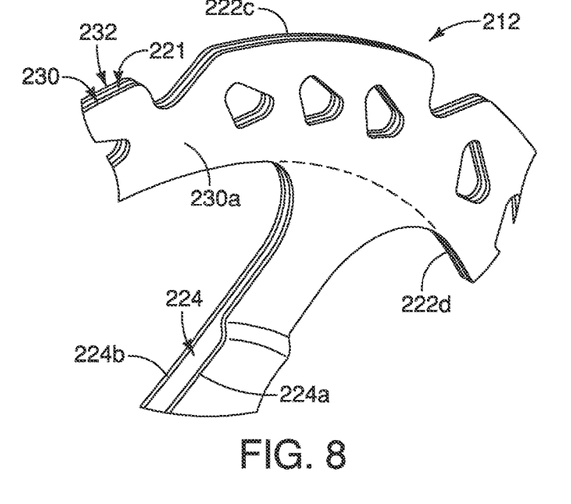
FIG. 8 is an enlarged perspective view of the bicycle disc brake rotor illustrated in FIG. 7.
Figure 9:
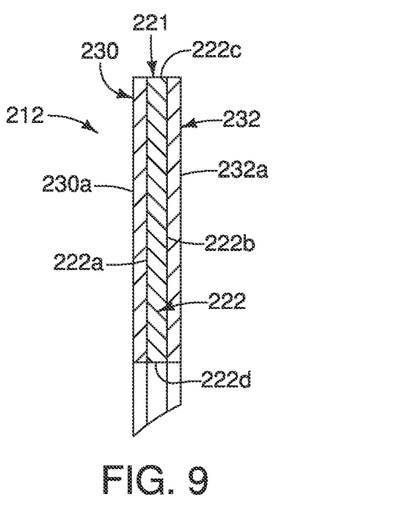
FIG. 9 is a cross sectional view of the bicycle disc brake rotor illustrated in FIGS. 1 to 4 as seen along section line 9-9 of FIG. 7.

Referring now to FIGS. 7 to 9, a bicycle disc brake rotor 212 in accordance with a third embodiment will now be explained. Here, the bicycle disc brake rotor 212 has a base rotor plate 221 that basically includes an outer portion 222, a plurality of connecting arms 224 extending radially inward from the outer portion 222, and a hub mounting portion 226 coupled to inner ends of the connecting arms 224. The connecting arms 224 constitute a connecting portion of the base rotor plate 221 that connects the outer portion 222 to the hub mounting portion 226. Also the connecting arms 224 (i.e., the connecting portion) and the hub mounting portion 226 constitute an inner portion of the base rotor plate 221.

The bicycle disc brake rotor 212 further includes a first thermally sprayed layer 230, which is laminated on the first base surface 222a of the outer portion 222 of the base rotor plate 221 to form a first outer surface 230a. Preferably, the bicycle disc brake rotor 212 further includes a second thermally sprayed layer 232, which is laminated on the second base surface 222b of the outer portion 222 of the base rotor plate 221 to form a second outer surface 232a. The first and second outer surfaces 230a and 232a are the outermost surfaces of the bicycle disc brake rotor 212.

Here in the third illustrated embodiment, the outer portion 222 is a separate member from the connecting arms 224 and the hub mounting portion 226. Also the third illustrated embodiment, the connecting arms 224 and the hub mounting portion 226 are integrally formed as a one-piece member of a suitable first material such as aluminum alloy or other suitable lightweight material. Thus, the bicycle disc brake rotor 212 is identical in construction to the bicycle disc brake rotor 12, except that the connecting arms 224 and the hub mounting portion 226 have been modified such that the hub mounting portion 226 has a splined hub mounting hole 226a and only a portion of the connecting arms 224 includes the first and second thermally sprayed layers 230 and 232. In this embodiment, the splined hub mounting hole 226a is centered on the center rotational axis A of the bicycle disc brake rotor 212. In view of the similarities between the bicycle disc brake rotors 12 and 212, the bicycle disc brake rotor 212 will not be discussed in great detail herein.

Similar to the prior embodiments, the outer portion 222 of the base rotor plate 221 has first and second base surfaces 222a and 222b that face in opposite axial directions of the bicycle disc brake rotor 212. The outer portion 222 of the base rotor plate 221 has an outer peripheral edge 222c and an inner peripheral edge 222d. The connecting arms 224 extend radially inward from the inner peripheral edge 222d of the outer portion 222.

Figure 10:
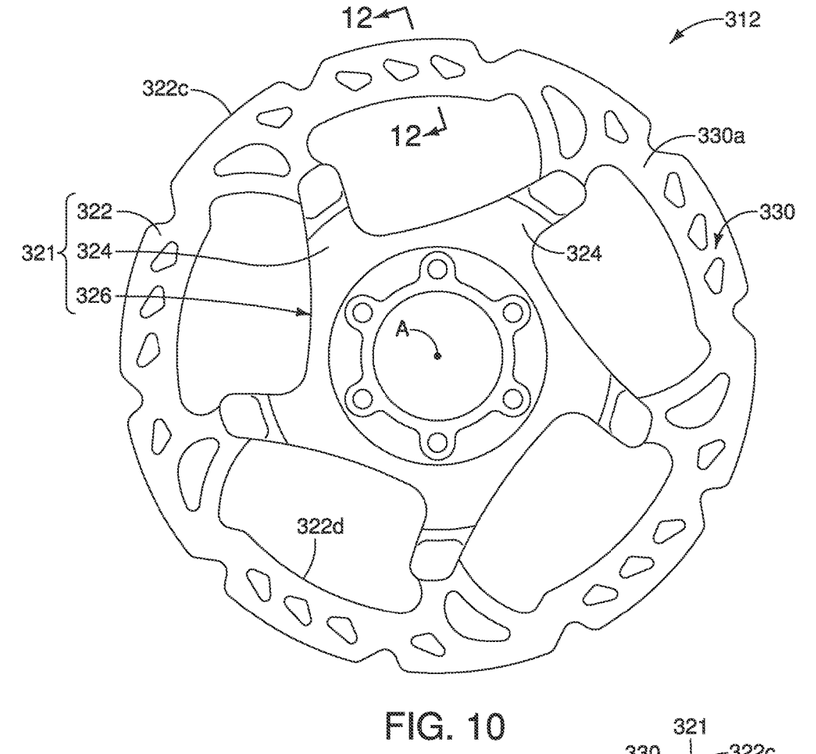
FIG. 10 is a side elevational view of a bicycle disc brake rotor in accordance with a fourth embodiment.
Figure 11:
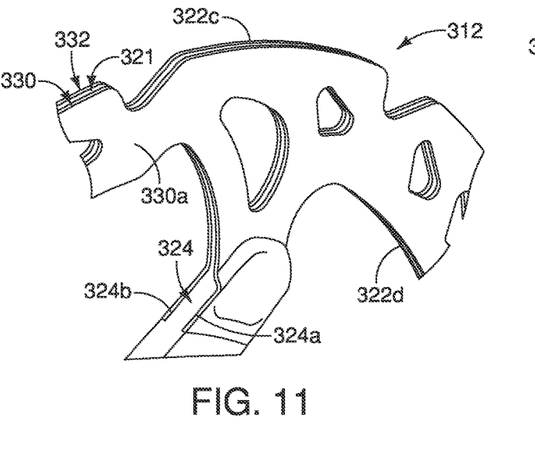
FIG. 11 is an enlarged perspective view of the disc brake rotor illustrated in FIG. 10.
Figure 12:
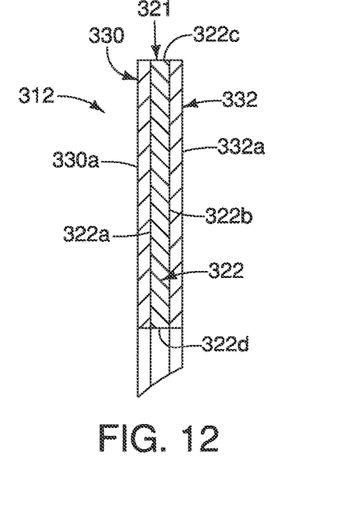
FIG. 12 is a cross sectional view of the bicycle disc brake rotor illustrated in FIGS. 1 to 4 as seen along section line 12-12 of FIG. 10.
Figure 13:
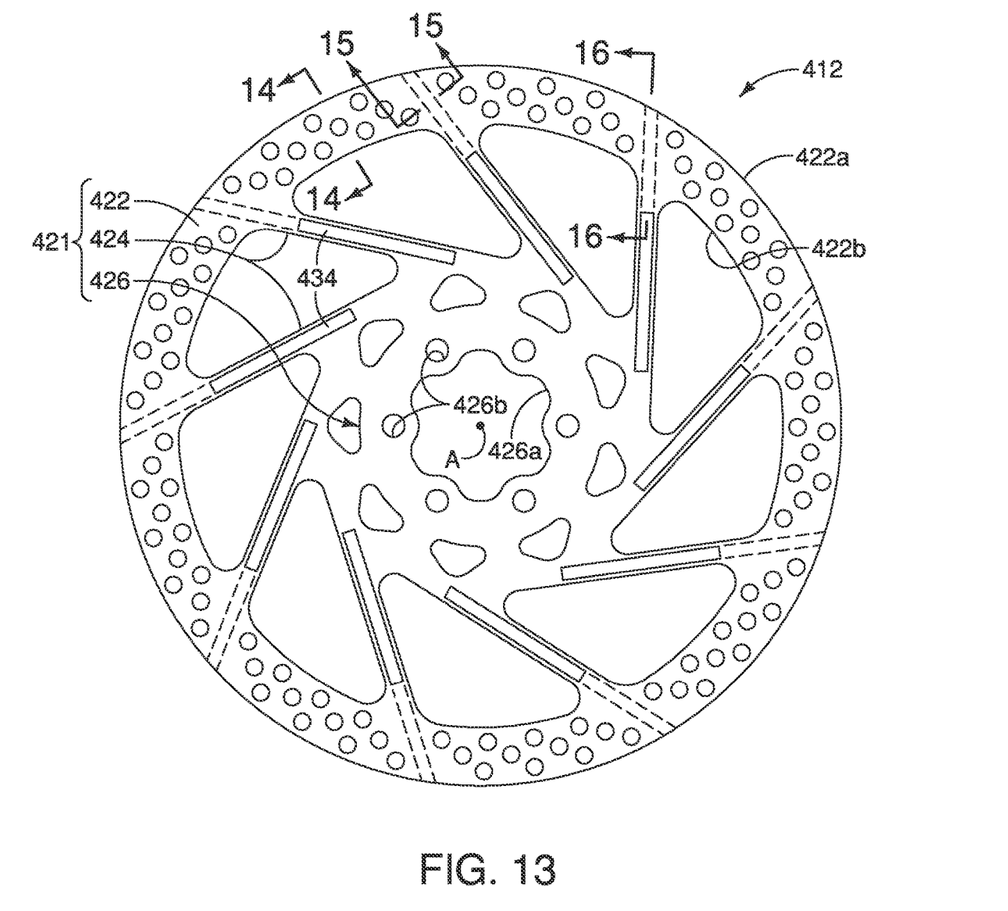
FIG. 13 is a side elevational view of a bicycle disc brake rotor in accordance with a fifth embodiment.
Figure 14:
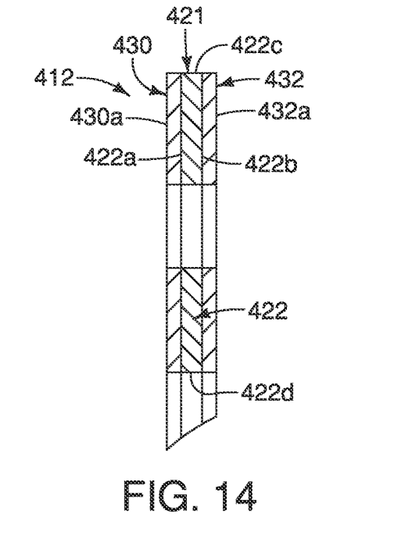
FIG. 14 is a cross sectional view of the bicycle disc brake rotor illustrated in FIG. 13 as seen along section line 14-14 of FIG. 13.
Figure 15:
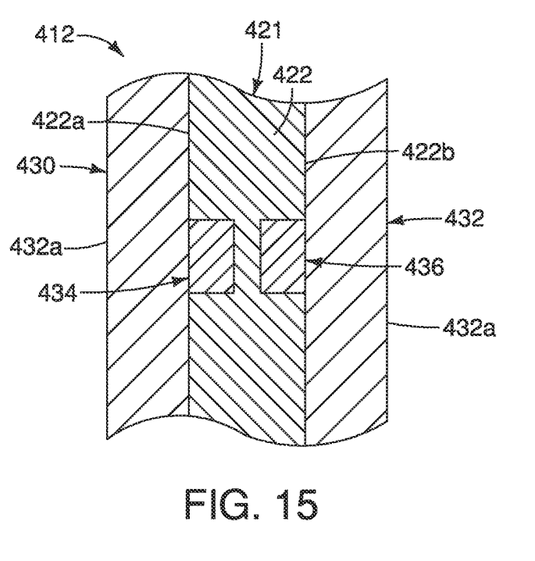
FIG. 15 is a cross sectional view of the bicycle disc brake rotor illustrated in FIG. 13 as seen along section line 15-15 of FIG. 13.
Figure 16:
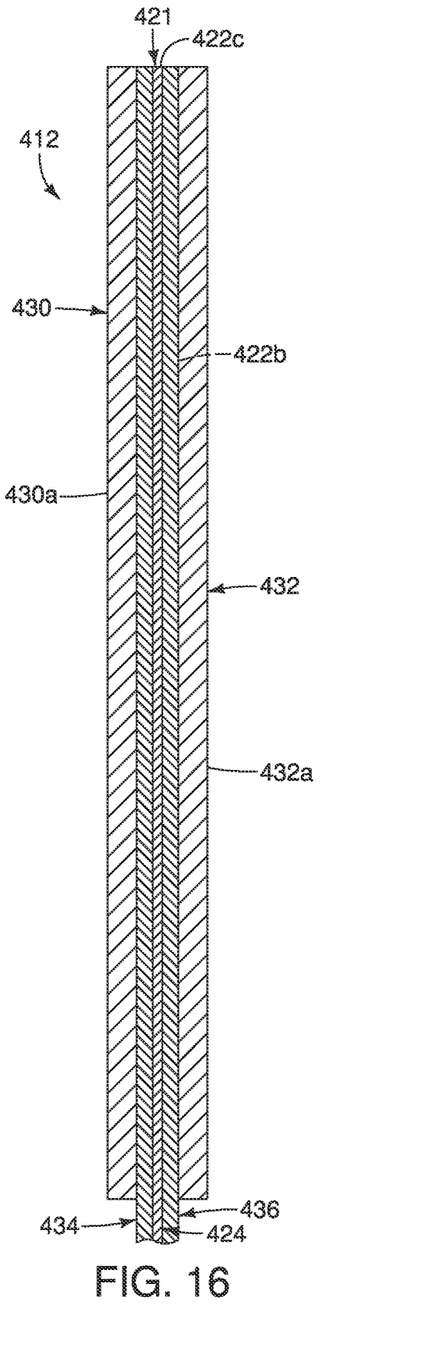
FIG. 16 is a cross sectional view of the bicycle disc brake rotor illustrated in FIG. 13 as seen along section line 16-16 of FIG. 13.

Referring now to FIGS. 10 to 12, a bicycle disc brake rotor 312 in accordance with a fourth embodiment will now be explained. Here, the bicycle disc brake rotor 312 has a base rotor plate 321 that basically includes an outer portion 322, a plurality of connecting arms 324 extending radially inward from the outer portion 322, and a hub mounting portion 326 coupled to inner ends of the connecting arms 324. The connecting arms 324 constitute a connecting portion of the base rotor plate 321 that connects the outer portion 322 to the hub mounting portion 326. Also the connecting arms 324 (i.e., the connecting portion) and the hub mounting portion 326 constitute an inner portion of the base rotor plate 321.

Similar to the prior embodiments, the bicycle disc brake rotor 312 further includes a first thermally sprayed layer 330, which is laminated on the first base surface 322a of the outer portion 322 of the base rotor plate 321 to form a first outer surface 330a. Preferably, the bicycle disc brake rotor 312 further includes a second thermally sprayed layer 332, which is laminated on the second base surface 322b of the outer portion 322 of the base rotor plate 321 to form a second outer surface 332a. The first and second outer surfaces 330a and 332a are the outermost surfaces of the bicycle disc brake rotor 312.

Here in the fourth illustrated embodiment, the outer portion 322 is integrally formed with connecting arms 324 and the hub mounting portion 326 as a one-piece member. Alternatively, the outer portion 322 can be preferably bonded to the outer end of the connecting arms 324 by welding, brazing or an adhesive if needed and/or desired. In the fourth illustrated embodiment, the base rotor plate 321 is a one-piece member that is formed a suitable first material such as aluminum alloy or other suitable lightweight material. Thus, the bicycle disc brake rotor 312 is identical in construction to the bicycle disc brake rotor 12, except that the connecting arms 324 and the hub mounting portion 326 have been modified such that the first and second thermally sprayed layers 330 and 332 only extends partially along the connecting arms 324, and such that the mounting portion 326 is thicker and configured to be stronger. In view of the similarities between the bicycle disc brake rotors 12 and 312, the bicycle disc brake rotor 312 will not be discussed in great detail herein.

Similar to the prior embodiments, the outer portion 322 of the base rotor plate 321 has first and second base surfaces 322a and 322b that face in opposite axial directions of the bicycle disc brake rotor 312. The connecting arms 324 extend radially inward from the inner peripheral edge 322d of the outer portion 322. The hub mounting portion 326 includes an opening 326a for accommodating a hub axle therethrough, and a plurality of hub mounting holes 326b that are arranged circumferentially about the center rotational axis A of the bicycle disc brake rotor 1312.

Referring now to FIGS. 13 to 16, a bicycle disc brake rotor 412 in accordance with a fifth embodiment will now be explained. Here, the bicycle disc brake rotor 412 has a base rotor plate 421 that basically includes an outer portion 422, a plurality of connecting arms 424 extending radially inward from the outer portion 422, and a hub mounting portion 426 coupled to inner ends of the connecting arms 424. The connecting arms 424 constitute a connecting portion of the base rotor plate 421 that connects the outer portion 422 to the hub mounting portion 426. Also the connecting arms 424 (i.e., the connecting portion) and the hub mounting portion 426 constitute an inner portion of the base rotor plate 421.

Similar to the prior embodiments, the bicycle disc brake rotor 412 further includes a first thermally sprayed layer 430, which is laminated on the first base surface 422*a* of the outer portion 422 of the base rotor plate 421 to form a first outer surface 430*a*. Preferably, the bicycle disc brake rotor 412 further includes a second thermally sprayed layer 232, which is laminated on the second base surface 422*b* of the outer portion 422 of the base rotor plate 421 to form a second outer surface 432*a*. The first and second outer surfaces 430*a* and 432*a* are the outermost surfaces of the bicycle disc brake rotor 412.

Here in the fifth illustrated embodiment, the bicycle disc brake rotor 412 further includes a third thermally sprayed layer 434 and a fourth thermally sprayed layer 436. The third thermally sprayed layer 434 laminated is between the first base surface 422*a* of the outer portion 422 of the base rotor plate 421 and the first thermally sprayed layer 430. The fourth thermally sprayed layer 436 is laminated between the second base surface 422*b* of the outer portion 422 of the base rotor plate 421 and the second thermally sprayed layer 432. In the fifth illustrated embodiment, the first and second base surfaces 422*a* and 422*b* include recesses that receive the third and fourth thermally sprayed layers 434 and 436, respectively.

Similar to the prior embodiments, the base rotor plate 421 is formed of aluminum alloy, the first and second thermally sprayed layers 430 and 432 are formed of stainless steel. The third and fourth thermally sprayed layers 434 and 436 are formed of a third material such as copper. The third and fourth thermally sprayed layers 434 and 436 are preferably applied by a cold spray process.

Thus, the bicycle disc brake rotor 412 is identical in construction to the bicycle disc brake rotor 12, except that the outer portion 422 and the connecting arms 424 have been modified to include recesses with the third and fourth thermally sprayed layers 434 and 436 applied thereto, and such that the first and second thermally sprayed layers 430 and 432 only extends partially along the connecting arms 424. In view of the similarities between the bicycle disc brake rotors 12 and 412, the bicycle disc brake rotor 412 will not be discussed in great detail herein.

Similar to the first embodiment, the outer portion 422 of the base rotor plate 121 has an outer peripheral edge 422*c* and an inner peripheral edge 422*d*. The connecting arms 424 extend radially inward from the inner peripheral edge 422*d* of the outer portion 422. The hub mounting portion 426 includes an opening 426*a* for accommodating a hub axle therethrough, and a plurality of hub mounting holes 426*b* that are arranged circumferentially about the center rotational axis A of the bicycle disc brake rotor 412.

Figure 17:
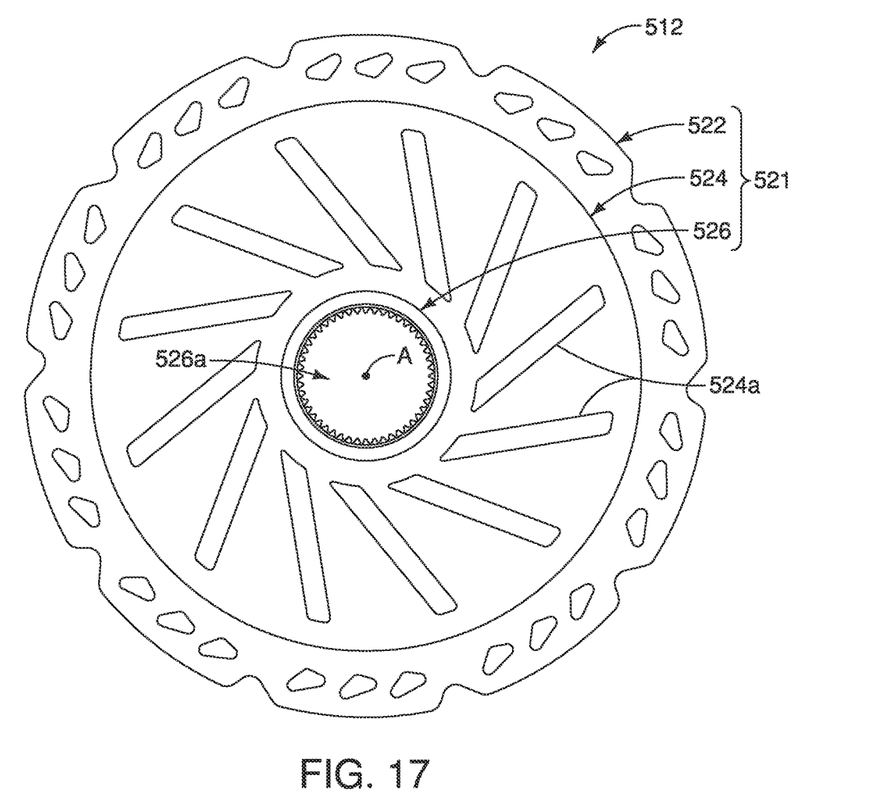
FIG. 17 is a side elevational view of a disc brake rotor in accordance with a sixth embodiment.
Figure 18:
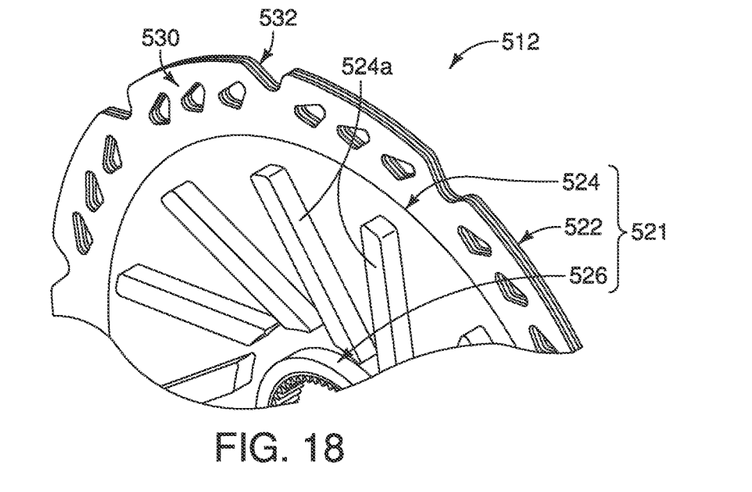
FIG. 18 is an enlarged perspective view of the bicycle disc brake rotor illustrated in FIG. 17.

Referring now to FIGS. 17 and 18, a bicycle disc brake rotor 512 in accordance with a sixth embodiment will now be explained. The bicycle disc brake rotor 512 has a base rotor plate 521 that includes an outer portion 522, a connecting portion 524 and a hub mounting portion 526. The connecting portion 524 connects the outer portion 522 to the hub mounting portion 526. Also the connecting portion 524 and the hub mounting portion 526 constitute an inner portion of the base rotor plate 521. Here in the sixth illustrated embodiment, the outer portion 522, the connecting portion 524 and the hub mounting portion 526 can be integrally formed as a one-piece member, similar to the base rotor plate 21, or can be formed of two or more separate pieces that fixedly coupled together as a unit, similar to the base rotor plates 121 and 221. The outer portion 522, the connecting portion 524 and the hub mounting portion 526 are formed of a suitable first material such as aluminum alloy or other suitable lightweight material.

The bicycle disc brake rotor 512 further includes a first thermally sprayed layer 530, which is laminated on a first base surface of the outer portion 522 of the base rotor plate 521 to form a first outer (braking) surface similar to the base rotor plates 21, 121, 221 and 321. Preferably, the bicycle disc brake rotor 512 further includes a second thermally sprayed layer 532, which is laminated on a second base surface of the outer portion 522 of the base rotor plate 521 to form a second outer (braking) surface similar to the base rotor plates 21, 121, 221 and 321. Similar to the prior embodiments, the first and second thermally sprayed layers 530 and 532 are made of a second material (e.g., stainless steel) that is different from the first material (e.g., aluminum alloy) of the base rotor plate 521. The first and second thermally sprayed layers 530 and 532 are applied by a cold spraying process so as to trace the contours of the outer portion 522, each of the connecting portion 524 and the hub mounting portion 526. In view of the similarities between the bicycle disc brake rotor 512 and the prior embodiments, the bicycle disc brake rotor 512 only the differences from the prior embodiments will now be discussed in further detail.

In particular, instead of a plurality of connecting arms, the connecting portion 524 is a single continuous disc that extends between the outer portion 522 and the hub mounting portion 526 in this sixth embodiment. The connecting portion 524 includes a plurality of protruding members 524*a* that form cooling fins or blocks. Each of the protruding members 524*a* constitutes a cooling projection. However, the protruding members 524*a* can other cooling configurations such as a single protruding member (e.g., a single spiral protruding member) can be used if needed and/or desired. The first thermally sprayed layer 530 can completely covers the protruding members 526*a* or can be uncoated as illustrated.

In this sixth embodiment, similar to some of the prior embodiments, the hub mounting portion 526 includes a hub mounting opening 526*a* that has a plurality of serrations arranged circumferentially about a center rotational axis A. Of course, it will be apparent from this disclosure that the hub mounting portion 526 can have other mounting configurations. Also, in this sixth embodiment, similar to some of the prior embodiments, the connecting portion 524 is integrally formed with both the outer portion 522 and the hub mounting portion 526 as a one-piece member. Of course, the hub mounting portion 526 can be a separate member that is attached to the connecting portion 524, which can be either integrally formed with the outer portion 5 as a one-piece, unitary member or a separate member that is attached to the outer portion 522.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle disc brake rotor comprising:
   a base rotor plate including an outer portion having first and second base surfaces facing in opposite axial directions and at least one ventilation hole extending between the first and second base surfaces, the at least one ventilation hole having an internal circumferential surface; and
   a first thermally sprayed layer disposed on the first base surface of the outer portion of the base rotor plate to form a first outer surface, the internal circumferential surface of the at least one ventilation hole being at least partially free of the first thermally sprayed layer.

2. The bicycle disc brake rotor according to claim 1, further comprising
   a second thermally sprayed layer disposed on the second base surface of the outer portion of the base rotor plate to form a second outer surface, the internal circumferential surface of the ventilation hole being at least partially free of the second thermally sprayed layer.

3. The bicycle disc brake rotor according to claim 1, wherein
   the first thermally sprayed layer has a higher wear resistance than the outer portion.

4. The bicycle disc brake rotor according to claim 1, wherein
   the first thermally sprayed layer has a lower thermal conductivity than the outer portion.

5. The bicycle disc brake rotor according to claim 1, wherein
   the base rotor plate further includes a plurality of connecting arms extending radially inward from the outer portion, and the first thermally sprayed layer overlying at least one of the connecting arms.

6. The bicycle disc brake rotor according to claim 1, wherein
   the base rotor plate further includes a plurality of connecting arms extending radially inward from the outer portion, and the first thermally sprayed layer at least partially overlying at least one of the connecting arms.

7. The bicycle disc brake rotor according to claim 2, wherein
   the base rotor plate further includes a plurality of connecting arms extending radially inward from the outer portion, and the first and second thermally sprayed layers overlying at least one of the connecting arms.

8. The bicycle disc brake rotor according to claim 1, wherein
   the base rotor plate further includes a plurality of connecting arms extending radially inward from the outer portion, and the first and second thermally sprayed layers overlying at least two of the connecting arms.

9. The bicycle disc brake rotor according to claim 1, wherein
   the base rotor plate is formed of aluminum alloy, and the first thermally sprayed layer is formed of stainless steel.

10. The bicycle disc brake rotor according to claim 1, wherein
    the base rotor plate further includes a connecting portion and a hub mounting portion, the connecting portion connecting the outer portion to the hub mounting portion.

11. The bicycle disc brake rotor according to claim 10, wherein
    the connecting portion has a single continuous disc extending between the outer portion and the hub mounting portion.

12. The bicycle disc brake rotor according to claim 10, wherein
    the connecting portion includes a plurality of connecting arms extending between the outer portion and the hub mounting portion.

13. The bicycle disc brake rotor according to claim 12, wherein
    at least one of the connecting arms is laminated by a copper layer which is provided by a thermally spray.

14. The bicycle disc brake rotor according to claim 12, wherein
    the outer portion and the connecting arms are integrally formed as a one-piece member of a first material.

15. The bicycle disc brake rotor according to claim 10, wherein
    the outer portion, the connecting portion and the hub mounting portion are integrally formed as a one-piece member.

16. The bicycle disc brake rotor according to claim 10, wherein
    the hub mounting portion is a separate member that is fixed to the inner ends of the connecting portion.

17. The bicycle disc brake rotor according to claim 10, wherein
    the hub mounting portion includes a plurality of hub mounting holes arranged circumferentially about a center rotational axis of the bicycle disc brake rotor.

18. The bicycle disc brake rotor according to claim 10, wherein
    the hub mounting portion includes a splined hub mounting hole centered on a center rotational axis of the bicycle disc brake rotor.

19. The bicycle disc brake rotor according to claim 1, further comprising
    a third thermally sprayed layer laminated between the first base surface of the outer portion of the base rotor plate and the first thermally sprayed layer,
    the base rotor plate being formed of aluminum alloy, the first thermally sprayed layer being formed of stainless steel, and the third thermally sprayed layer being formed of copper.

20. The bicycle disc brake rotor according to claim 19, further comprising
    a fourth thermally sprayed layer laminated between the second base surface of the outer portion of the base rotor plate and the second thermally sprayed layer,
    the second thermally sprayed layer being formed of stainless steel, and the fourth thermally sprayed layer being formed of copper.

21. A bicycle disc brake rotor comprising:
    a base rotor plate including an outer portion having first and second base surfaces facing in opposite axial directions, an inner portion disposed radially inward of the outer portion, and at least one ventilation hole extending between the first and second base surfaces, the at least one ventilation hole having an internal circumferential surface; and a first thermally sprayed layer disposed on the first base surface of the outer portion of the base rotor plate to form a first outer surface, the internal circumferential surface of the at least one ventilation hole being at least partially free of the first thermally sprayed layer.

22. The bicycle disc brake rotor according to claim 21, wherein
the inner portion includes a connecting portion and a hub mounting portion, the connecting portion connecting the outer portion to the hub mounting portion.

23. The bicycle disc brake rotor according to claim 21, further comprising
a second thermally sprayed layer disposed on the second base surface of the outer portion of the base rotor plate to form a second outer surface, the internal circumferential surface of the ventilation hole being at least partially free of the second thermally sprayed layer.

\* \* \* \* \*